United States Patent
Everett

(10) Patent No.: US 8,758,618 B2
(45) Date of Patent: Jun. 24, 2014

(54) METHOD AND A DEVICE FOR BIOLOGICALLY TREATING A CONTAMINATED LIQUID FEEDSTOCK INCLUDING A DISPERSIBLE AND DIGESTIBLE ORGANIC LIQUID PHASE

(75) Inventor: William Everett, Paris (FR)

(73) Assignee: Dewdrops, Sin Le Noble (FR)

( * ) Notice: Subject to any disclaimer, the term of this patent is extended or adjusted under 35 U.S.C. 154(b) by 669 days.

(21) Appl. No.: 12/998,493

(22) PCT Filed: Oct. 23, 2009

(86) PCT No.: PCT/FR2009/052042
§ 371 (c)(1),
(2), (4) Date: Jun. 28, 2011

(87) PCT Pub. No.: WO2010/049629
PCT Pub. Date: May 6, 2010

(65) Prior Publication Data
US 2011/0253626 A1    Oct. 20, 2011

(30) Foreign Application Priority Data
Oct. 27, 2008 (FR) .................................. 08 05957

(51) Int. Cl.
*C02F 3/12* (2006.01)
(52) U.S. Cl.
USPC ......... 210/606; 210/758; 210/760; 210/748.1

(58) Field of Classification Search
USPC ............................... 210/606, 758, 760, 748.1
See application file for complete search history.

(56) References Cited

FOREIGN PATENT DOCUMENTS

| WO | WO 96/24937 | 8/1996 |
| WO | WO 02/12135 | 2/2002 |
| WO | WO 2005/123603 | 12/2005 |

OTHER PUBLICATIONS

International Search Report for PCT/FR2009/052042, mailed Oct. 6, 2010.
FR Search Report for 08/05957, dated Jul. 29, 2009.

*Primary Examiner* — Chester Barry
(74) *Attorney, Agent, or Firm* — Nixon & Vanderhye P.C.

(57) ABSTRACT

The installation comprises three reaction vessels (100, 200, 300) in series, each containing an aqueous phase and a specific bacterial population. The vessels serve in succession to dissolve the liquid feedstock for treatment by enzymatic hydrolysis, then to biodegrade the resulting effluent by biological digestion, and finally to reduce the residual bacterial components by biological action. The vessels are mutually isolated by tangential filters (108, 208, 308) and by centrifugal separators (212, 312) for filtering the biomass from the reaction products. The result is a final liquid effluent (EFF/N) that is essentially non-organic, with the filtered biomass downstream constituting an ultimate organic waste (DU) of reduced volume.

16 Claims, 3 Drawing Sheets

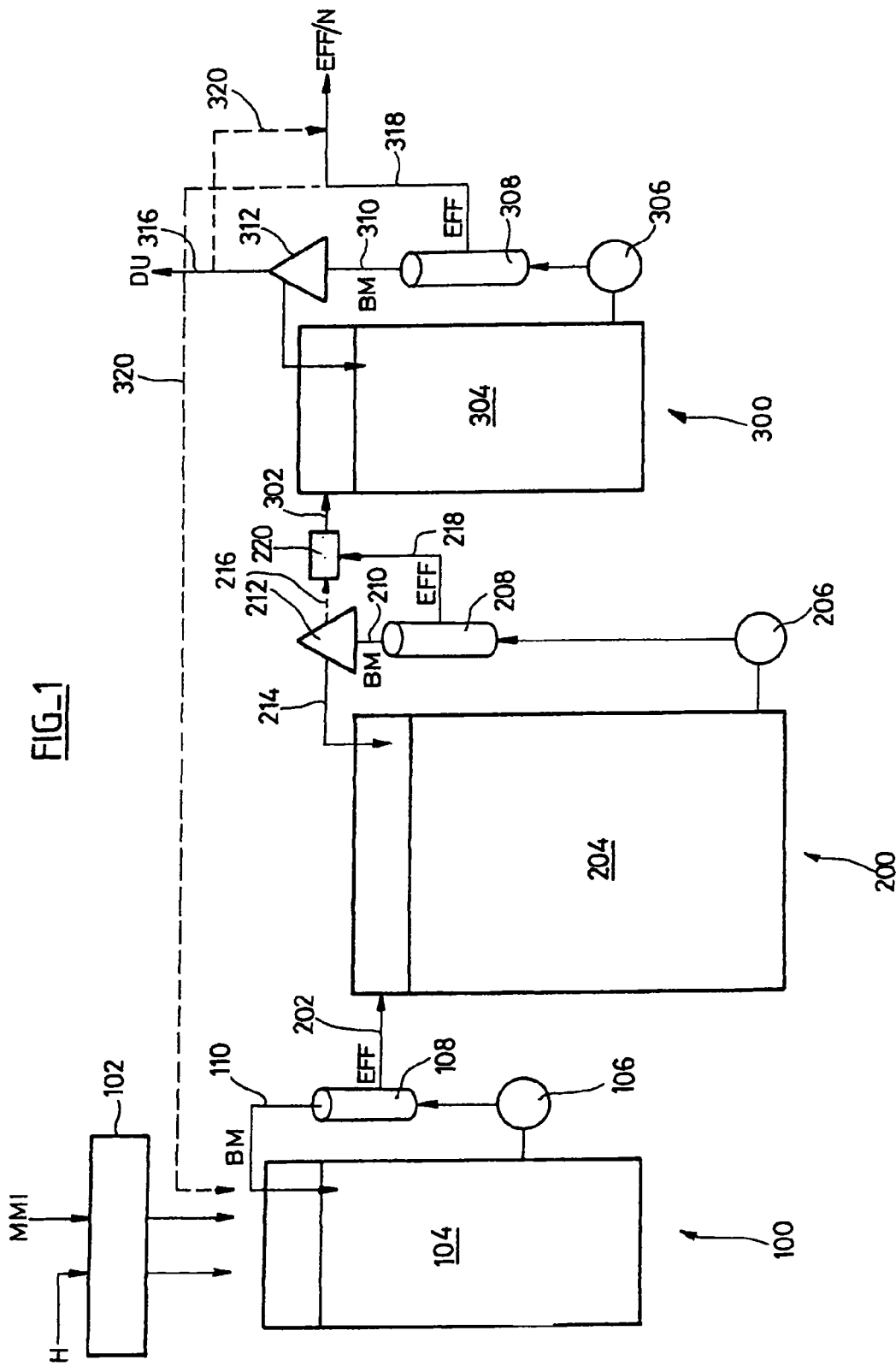
FIG_1

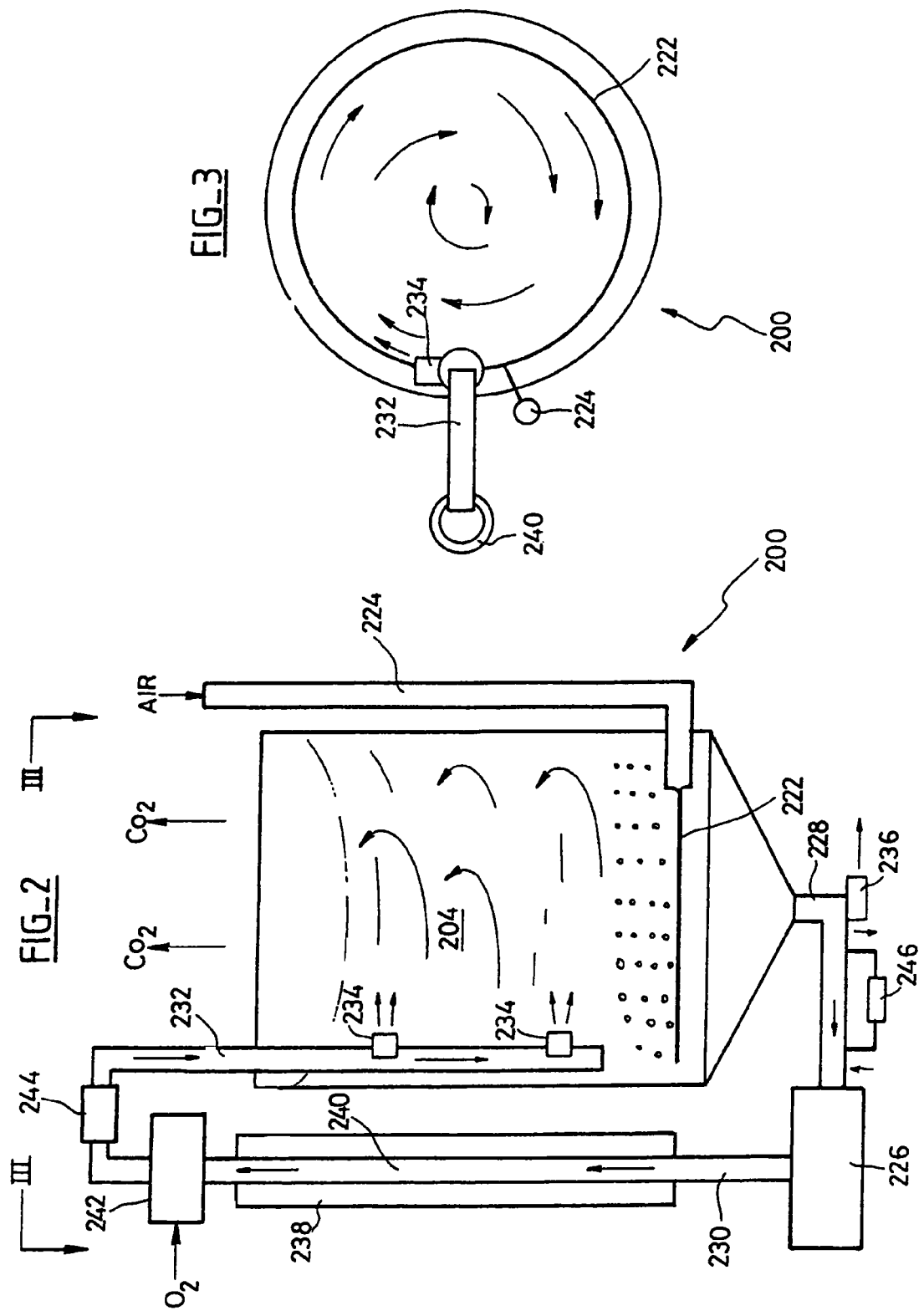

METHOD AND A DEVICE FOR BIOLOGICALLY TREATING A CONTAMINATED LIQUID FEEDSTOCK INCLUDING A DISPERSIBLE AND DIGESTIBLE ORGANIC LIQUID PHASE

This application is the U.S. national phase of International Application No. PCT/FR2009/052042 filed 23 Oct. 2009 which designated the U.S. and claims priority to FR patent application Ser. No. 08/05957 filed 27 Oct. 2008, the entire contents of each of which are hereby incorporated by reference.

The invention relates to a method and an installation for biologically treating a contaminated liquid feedstock including a dispersible and digestible organic liquid phase.

The invention applies most particularly to toxic oils and solvents, in particular those contaminated by radioactive substances. Such oils or solvents need to be destroyed or decomposed into effluents that are acceptable for the site.

Nevertheless, the invention is applicable to treating substances other than oils or solvents, providing they are organic liquids that are dispersible (unlike tars, for example) and digestible, i.e. capable of being subjected to the enzymatic action of microorganisms that use the organic liquid as a source of carbon for their own aerobic metabolism. The oxidation of the liquid for treatment by the microorganisms is accompanied by carbon dioxide and water being given off.

The invention also applies to treating feedstocks including fine particles in suspension in an organic liquid phase, e.g. particles of a catalyst that is used in suspension in the oil, so as to make it possible to regenerate these particles of catalyst.

In the description below, the terms "oils" and "oils or solvents" are used for convenience, however the entire description can be generalized to other types of organic liquid feedstock, providing the feedstock presents the properties specified above.

Several techniques exist for eliminating toxic oils.

The simplest technique consists in burning such oils in an incinerator, but that technique presents several drawbacks. Firstly, the oil generally needs to be mixed with other waste, and that type of elimination is difficult to implement continuously. Furthermore, there is a risk of producing volatile toxic compounds during incineration, which compounds must be thoroughly filtered before exhausting to the atmosphere.

Another technique consists in subjecting the oils to oxidation by a wet technique, using supercritical water. That technique is very effective and thoroughly mastered, but it is very difficult to implement (pressures of at least 221 bars and temperatures of at least 376° C.). Consequently, that technique requires large amounts of initial investment, giving rise to high operating costs, and it involves draconian safety measures associated with very high pressures.

The third technique, the technique of the invention, consists in oxidizing the oils biologically in the presence of microorganisms, at a temperature of about 30° C. to 37° C. for optimizing bacterial metabolism. Oxygen is provided by continuous aeration of the system, and oxidizing oils produces only carbon dioxide and water, which are without danger. Furthermore, the treatment pressure does not exceed 3 bars, and this technique is adapted to very variable flows for treatment.

WO 96/24937 A1 describes a method and an installation of this type for eliminating contaminated oils or solvents.

However that method does not provide satisfactory degradation of feedstocks such as contaminated oils that are constituted by a mixture of several tens of different ingredients that are structurally very diverse: cyclic, branched, linear, etc., together with a large number of distinct molecules in each category.

Any given bacterial population has a preference for digesting a specific category of molecules, but not all molecules. As a result, the bacteria tend to degrade the molecules that are the most digestible, i.e. they "eat what is easiest to eat". Unfortunately, since the treatment vessel is fed continuously, there is continuous renewal of the most easily-digested fraction, which ends up being the only or practically the only fraction to be degraded by the biomass. That phenomenon leads to an accumulation of molecules that are difficult to digest, with the bacteria never starting to degrade them. Such an accumulation constitutes a factor for poisoning the biomass, thereby leading rapidly to degrading the liquid feedstock degradation process coming to an end and/or to autolysis (self-digestion) of the bacterial mass to the detriment of digesting the oil, which takes longer and is more difficult.

Since digestion via the biomass is not sufficient for producing an effluent that is acceptable, the effluent needs to be subjected to post-treatment that is relatively complex and expensive (evaporation, filtering on active carbon, . . . ), thereby leading to the production of additional waste, in particular active carbon that needs to be renewed regularly.

Furthermore, the technique described in that document requires biomass to be injected continuously into the installation, implying that the additional biomass needs to be eliminated downstream.

Furthermore, that method is designed essentially for treating waste continuously, at a rate that is as constant as possible insofar as any significant variation in the quantity or the nature of the feedstock for treatment is likely to modify substantially the general equilibrium of the method.

Finally, that method requires continuous monitoring of the various reactions and treatments that are implemented, with practically permanent presence of an operator to monitor progress of the process and to take appropriate adjustment and setting actions.

One of the objects of the invention is to remedy those various drawbacks by proposing a method and an installation for biologically eliminating organic waste such as toxic oils or solvents, with high yield, with the ability to adapt to a wide variety of flows (and without interrupting operation), and with the capacity to treat large quantities of waste, thus enabling operation to be performed at an industrial scale.

More precisely, an object of the present invention is to provide such a method and such an installation that enable a very significant reduction of all kinds of costs, be they:
  initial investment costs;
  operating costs resulting from daily operation of the installation; or
  future costs (also known as "heritage costs") involving dismantling the machine when its turn comes to become waste, as happens in installations for treating radioactive substances.

Another object of the invention is to propose such a technique that makes it possible, without complex post-treatment, to obtain directly at the outlet from the method a liquid effluent that is acceptable for the site (legal standards), with the quantity discharged being reduced to a minimum, and while producing a minimum amount of ultimate waste.

Another object of the invention is to propose such an installation that can be controlled in simple and automatic manner so as to avoid having an operator permanently present on site for monitoring and implementing the treatment.

Yet another object of the invention is to provide very great operating flexibility concerning the quantities and the variety of waste to be treated, with it being possible in particular to treat waste in batches, unlike previously-proposed systems that are essentially designed for continuous treatments.

As explained below, another aspect of the flexibility of the method and installation of the invention lies in the fact that the system as a whole is a system that is very stable, with behavior that is relatively predictable and calculable, thus making it possible to limit initial adjustments and trial and error each time there is a change in the nature of the waste for treatment.

The method of the invention, which is of the general type already disclosed by above-mentioned WO 96/24937 A1, is characterized by the following successive steps consisting in:

a) feeding a first vessel with the liquid feedstock for treatment, the first vessel containing an aqueous phase and a first bacterial population;

b) dissolving the liquid feedstock for treatment in the first vessel by enzymatic hydrolysis using the first bacterial, population;

c) drawing off a first reaction liquid product from the first vessel;

d) filtering from the first reaction product the biomass contained therein, thereby obtaining a first effluent;

e) feeding a second vessel with the first effluent, the second vessel containing an aqueous phase and a second bacterial population that is different from the first bacterial population;

f) biodegrading the first effluent in the second vessel by biological digestion using the second bacterial population;

g) drawing off a second liquid reaction product from the second vessel;

h) filtering from the second reaction product the biomass contained therein in order to obtain a second effluent;

i) adjusting the bacterial concentration in the second vessel by extracting the surplus biomass;

j) feeding a third vessel with the second effluent, the third vessel containing an aqueous phase and a third bacterial population that is different from the first and second bacterial populations;

k) reducing the residual bacterial components of the second effluent in the third vessel by bacterial action using the third bacterial population;

l) drawing off a third liquid reaction product from the third vessel; and m) filtering from the third reaction product the biomass contained therein in order to obtain a third effluent;

the third effluent constituting a final liquid effluent that is essentially non-organic, and the separated biomass constituting an ultimate organic waste of reduced volume.

By means of this method, by increasing the number of vessels and isolating them from one another (preventing bacteria from migrating from one vessel to the next), it is possible to specialize the bacterial populations in each of the three vessels as a function of the different molecules of the feedstock that are to be digested: the easily-digested fraction is degraded in the first vessel, while the molecules that the biomass in the first vessel have not begun to digest are concentrated in the second vessel where the bacteria (selected specifically as a function of the fraction for digesting) serve to digest the remaining fraction, and so on with the third vessel. The metabolism of the biomass may well evolve over time to optimize digestion of the molecules that are the most difficult to digest.

Furthermore, adjusting the concentration of bacteria in the second vessel makes it possible to avoid a "self-digestion" phenomenon occurring in the bacterial mass to the detriment of digesting the oil, which takes longer and is more difficult.

Advantageously, in this method:

steps d), h), and/or m) further comprise recycling the separated biomass to the vessel from which the filtered reaction product was drawn off; this enables the bacterial populations to be adapted to each of the steps and avoids any risk of contamination between the various vessels;

the method further includes recycling the final liquid effluent obtained in step m) to the first vessel;

step h) further comprises chemical oxidation of the filtered second effluent and/or of the excess biomass obtained by filtering;

step k) includes reducing the biomass in the third reactor;

before step a), there is also provided pre-treating the liquid feedstock for treatment by oxidation using the Fenton reaction;

there is also provided a step of drawing off the excess biomass in the first, second, and/or third vessels, and of digesting said excess biomass with a liquid phase and a solid mineral waste being separated; and there is also provided a step of post-treating the final liquid effluent from filtering of the third reaction product and/or the liquid phase from digesting the excess biomass by means of combined UV irradiation and ozonization.

The invention also provides a corresponding installation, comprising means for implementing the various steps of the method specified above.

Advantageously, the installation may also make provision for:

means for filtering the first, second, and/or third products to comprise respective tangential membrane filters;

means for filtering the second and/or third products to further comprise respective centrifugal separators and/or respective floatation systems;

the second vessel to comprise mechanical stirring and antifoaming means suitable for sucking in the foam formed during the biodegradation process and incorporating said foam in the aqueous phase contained in the vessel; and the second vessel to include means for pumping and recirculating the content of the vessel, together with temperature-regulation means; means for aerating the liquid phase, calibrated homogenization means; and/or means for measuring and/or taking samples, these various means being located in the recirculation circuit outside the volume of the vessel.

There follows a description of an implementation of the invention given with reference to the accompanying drawings in which the same numerical references are used from one figure to another to designate elements that are identical or functionally similar.

FIG. 1 is a diagrammatic view of the installation of the invention, showing the various elements for implementing the successive steps of the method.

FIG. 2 shows in greater detail the structure of the central reactor for biodegrading oil.

FIG. 3 is a plan view of the same reactor, seen looking along III-III of FIG. 2.

Figure 4:
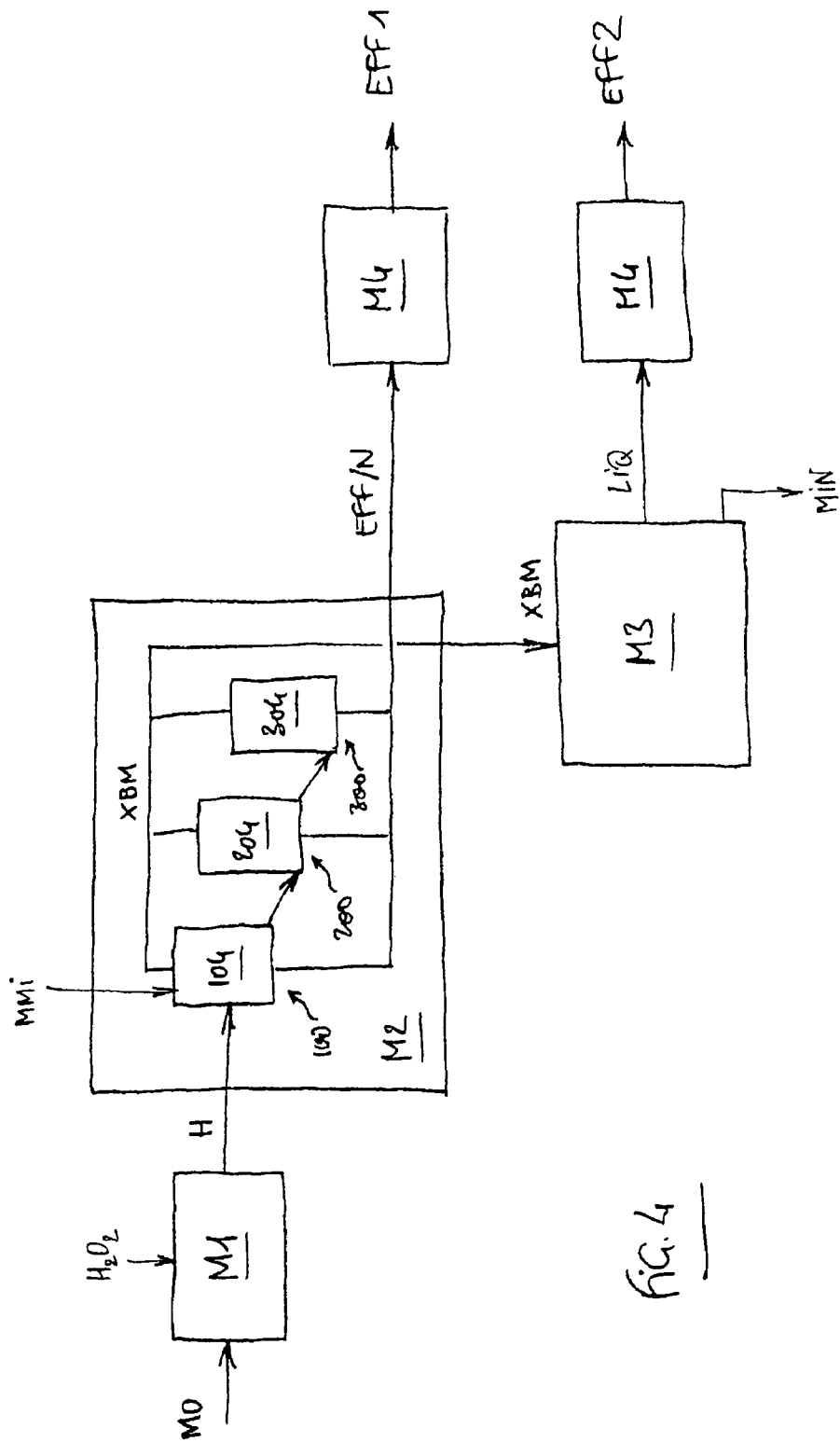
FIG. 4 is a diagram showing a complete system incorporating the various components of the installation described with reference to FIG. 1.

As shown in FIG. 1, the installation of the invention essentially comprises three distinct reactors 100, 200, and 300 in the form of three respective vessels of determined volumes that are connected in series.

The first reactor 100 is for dissolving oils by enzymatic hydrolysis. Toxic oils H are introduced into the reactor 100 by a metering pump 102 at a determined rate. The same metering pump injects an industrial minimal medium MMI made up of purified water and mineral salts that are essential for the development of microorganisms. This is all mixed with the aqueous phase 104 contained in the first reactor 100, where the microorganisms dissolve the oils by hydrolysis by means of a specific enzymatic action of a selected population of bacterial microorganisms. The transit time depends on the type of oil for treatment and on the selected microorganisms. In general, and depending on the type of oil, the oil flow rate typically varies from 20 microliters (µL) to 200 µL per liter (L) of reaction volume and per hour (h).

This stage of dissolving oils is critical for implementing the method of the invention, since it increases considerably the bioavailability of these oils. To obtain effective biodegradation, it is necessary for the microorganisms to have access to the organic substrate, and that is simpler when the oil is soluble in the aqueous phase.

The bath containing the dissolved oils is drawn off from the bottom of the reactor by a pump 106, leaving oils that are not yet dissolved on the surface. This ensures that only dissolved oils are transferred to the reactor 200. The dissolved oils as drawn off in this way are subjected to the action of a tangential filter 108 serving to separate the biomass BM from a fraction of the liquid effluent EFF (permeate or filtrate). The retentate (biomass) is returned to the reactor 100 via a pipe 110, thus preventing the microorganisms of the first reactor 100 mixing with the microorganisms of the reactor 200. This step of separating effluent and biomass also serves to optimize the bacterial population in each reactor depending on its function, with specific microorganisms being selected for the first reactor 100, which is optimized for hydrolysis, and different specific microorganisms being selected for the second reactor 200, which is optimized for biodegrading oil.

The same remark also applies to achieving isolation between the second reactor 200 and the third reactor 300, which isolation is achieved by using a tangential membrane filter, as described below.

The use of a tangential membrane filter is preferred over mere settling, since such a filter makes it possible to adjust exactly the desired quantity of effluent, while ensuring that the biomass does not pass along in the effluent.

The isolation achieved by using a tangential membrane filter also provides additional security from a biological point of view, e.g. in the event of the bacteria dying as a result of the presence of protozoa in the aqueous phase of one of the reactors. Insofar as it is possible to ensure that the biomass does not pass through the filter, such contamination will not extend to the reactor situated downstream.

After the initial treatment (dissolving the oils) performed by the first reactor 100, the effluent containing the oil for treatment is conveyed by a pipe 202 to the second reactor 200, which is the reactor that implements the main step of oil biodegradation. By way of example, this second reactor presents a capacity of 100 L and the transit time therethrough is typically 343 h.

The second reactor 200, described in greater detail below with reference to FIGS. 2 and 3, serves to digest oils in the aqueous phase 204, under the effect of microorganisms that are selected specifically to optimize this biological digestion function, which microorganisms are different from those contained in the other two reactors 100 and 300.

The passage to the third and last reactor 300 is provided in the same manner as the passage from the first reactor 100 to the second reactor 200: the fluid is drawn off from the bottom of the reactor 200 by a pump 206 and then passes through a tangential filter 208 where the biomass BM (retentate) is separated from a liquid effluent portion EFF. The effluent produced by the tangential filter 208 via the pipe 218 is taken to a chemical oxidation device 220 that operates by ozonization or by oxygen peroxide treatment to complete oxidation of the biodegradation products. After this oxidation step, the effluent is directed to the reactor 300 via the pipe 302.

The biomass 210 leaving the tangential filter 208 via the pipe 210 is recycled to the second reactor 200 via a pipe 214. Any surplus biomass formed in the second reactor 200 during oil biodegradation may be extracted by a centrifugal separator 212 and/or by a floatation system, via the pipe 216. The surplus biomass may also be directed to the chemical oxidation device 220 via the pipe 216 prior to being taken to the reactor 300 by the pipe 302.

It is important to adjust the concentration of bacteria in the reactor 200, ensuring that it does not become excessive (typically the upper limit is $10^9$ cells per milliliter (mL)). An excessive concentration leads to a large fraction of the bacteria dying, thereby producing organic material that is easy for the living bacteria to digest. This "self-digestion" phenomenon of the mass of bacteria occurs to the detriment of digesting oil, which takes longer and is more difficult. To avoid this phenomenon, instead of recycling the reactor biomass (via the pipe 214), this biomass output from the separator 212 is extracted and destroyed by oxidation (pipe 216 to the device 220).

The effluent as oxidized in this way by the device 200 is delivered by the pipe 302 to the third reactor 300 which serves to reduce the excess biomass formed while metabolizing oils or toxic solvents in the reactor 200. The effluent conveyed by the tube 302 contains the ingredients of bacterial cells that have been lyzed during the step of chemical oxidation by the device 220, which ingredients serve as nutrients for the bacteria of the third reactor, by action in the aqueous phase 304 of a third population of bacteria selected specifically to optimize this final degradation function, which bacteria are generally different from the bacteria of the other two reactors 100 and 200. By way of example, the third reactor 300 presents a capacity of 20 L, and the transit time therethrough is typically 68 h. It thus serves to mineralize and thus considerably reduce the excess biomass produced in the second reactor 200. In addition, it adds an additional transit time for optionally degrading the molecules that are the most resistant to the enzymatic action of the microorganisms. The effluent is drawn off from the third reactor 300 by a pump 306 and is then applied to a third and last tangential filter system 308: the separated biomass BM is applied via a pipe 310 to a centrifugal separator 312 and/or to a floatation system, of the same type as the separator 212 associated with the second reactor. The solid effluent as separated in this way, constituting all of the organic fraction produced by the method, constitutes ultimate waste DU that may subsequently be dried. This non-mineralized solid effluent (rot-proof, sterile, and thus without danger) nevertheless presents a volume that is very small, and therefore does not constitute a constraint on the method.

The liquid effluent EFF delivered by the tangential filter 308 is conveyed by a pipe 318 and constitutes an effluent EFF/N that is acceptable for the site, typically an effluent having as its main characteristic a chemical oxygen demand COD that is strictly less than 150 micrograms per liter (mg/L).

If allowed by disposal standards, it is possible to dilute all or some of the organic waste coming from the separation by the filter 312 in the effluent EFF/N, as represented by arrow 320. If dilution is total, only liquid effluent remains, which is simpler for waste management.

It should be observed that the flow rates are controlled in such a manner as to maintain the levels in the reactors so that the volumes in the reactors do not vary and so that the materials balance is in equilibrium between the inlet and the outlet of the installation (thereby facilitating traceability).

Possibly, and without this having any influence on the materials balance, a fraction of the effluent obtained at the outlet from the installation may be recycled to the first reactor 100 (arrow 320) depending on the results of analyzing the effluent.

Incidentally, it should be observed that the invention makes it possible, advantageously, to treat oils of different kinds in batches with the bacterial populations of the various reactors being adapted accordingly, and with it being possible to begin the treatment of one batch before the treatment of the preceding batch has been terminated. For example, at the end of the treatment of a first batch, when the oil has been completely dissolved and is being subjected to treatment in the reactors 200 and 300, it is possible to begin dissolving the oil of the second batch in the reactor 100, without that having any incidence on the end of the treatment applied to the first batch. This is made possible by the biological treatments in the three vessels 100, 200, and 300 being separated so that the respective reaction conditions therein (selected microorganisms populations, various operating conditions, etc.) can be adjusted separately for each reactor, and independently of the other two.

There follows a description in greater detail, with reference to FIGS. 2 and 3, of the structure of the second reactor 200 that serves to perform the biodegradation proper of toxic oils.

This biodegradation reactor includes a certain number of original elements that make it possible simultaneously to perform several functions, while simplifying the device so as to reduce maintenance operations.

The air needed for oxidation may be injected by a strip 222 at the bottom of the reactor, which strip is fed by a pipe 224 situated outside the vessel of the reactor. In a variant, or in addition, a system 242 is provided for incorporating air by a Venturi effect, which system is mounted on the pipe 230, together with a homogenizer device 244 based on the molecular stirring property of ultrasound: depending on the frequency of the ultrasound emitted, particles in solution (bacteria, micelles, bubbles of air, etc.) may be destroyed selectively depending on their size by the vibratory effect. For example, it is thus possible to decide to destroy particles greater than 100 micrometers ($\mu m$) in size so as to spare the bacteria, which generally measure 1 $\mu m$.

An anti-foaming function is provided by means of an assembly comprising in particular a flexible rotor pump 226 sucking in the content of the reactor 200 continuously from the bottom, at 228, and delivering this content via a pipe 230, 232 to outlets 234 that are oriented tangentially (FIG. 3) so as to create a vortex inside the vessel that prevents foam from accumulating at the surface of the content in the reactor. Any foam that forms during the method runs the risk of trapping oils, thereby making it unavailable to the bacteria. The system described herein makes it possible, with purely mechanical means, to disperse and homogenize the foam, such that the foam is reincorporated in the aqueous phase, thereby increasing the biodegradability of the oils and thus increasing the effectiveness of the method, without it being necessary to add any chemical anti-foaming agent, as is often necessary.

At the lowest point, at 236, there is also provided a discharge and emptying pipe for removal of the liquid phase.

The reactor 200 also performs a temperature regulation function by means of a sleeve 238 surrounding the portion 240 of the pipe 230 of the above-described looped recirculation system, which sleeve conveys a heat-transfer fluid for heating or cooling. The liquid phase contained in the reactor is thus temperature-regulated, with this being done by an element that is situated outside the vessel, thus requiring minimum intervention in the event of maintenance (unlike conventional immersed heater systems). This advantage is associated with the advantage of this "gentle" heating method that is more reliable and that, unlike heating systems based on resistive elements, does not give rise to any hot points, which are lethal for microorganisms.

It should be observed that all of the elements as described above are located outside the vessel of the reactor, thus making it possible to simplify maintenance operations very greatly. Furthermore, the only moving part of this assembly is the flexible rotor pump 226, thus giving the installation a very high degree of robustness, with the installation being capable of operating continuously for very long periods without any particular intervention.

Finally, the reactor includes a measurement cell 246 mounted in parallel with the extraction pipe situated at 228 at the bottom of the reactor, the measurement cell serving to take representative samples and to analyze these samples (pH, temperature, dissolved oxygen, etc.) by appropriate sensors. The data provided by the sensors, and the measurement of the $CO_2$ given off by the reaction, thus make it possible to obtain an indication concerning the activity of the bath contained in the reactor, practically in real time, and thus obtain an indication about the effectiveness of the biomass, thereby making it possible to control the entire installation in very effective manner.

FIG. 4 is a diagram of a complete system derived from the installation described with reference to FIG. 1.

The system serves to transform toxic oils or solvents, in particular radioactive waste, into a liquid effluent that is suitable for being disposed of in a waste water treatment plant.

This system implements a biodegradation module M2 corresponding to the installation described with reference to FIG. 1, having three specialized reactors 100, 200, and 300 serving to metabolize the organic material in water, carbon dioxide, and biomass, by using different specialized bacterial populations that are contained in respective vessels 104, 204, and 304.

As explained above, a certain class of molecule is destroyed in the first reactor 100 (the molecules that are the simplest to degrade), and then another class is destroyed in the second reactor 200, and so on in the third reactor 300, with the bacterial populations in each vessel automatically adapting under the pressure of natural selection as a function of the organic molecules present in their environments.

The first reactor 100 is fed with organic material (oil H) and also with mineral salts MMI necessary for biological growth. The three reactors 100, 200, and 300 are fed with air, are temperature-stabilized at about 30° C., and they have pH at values lying in the range 6.5 to 7.5. Each reactor possesses at its outlet a tangential filter that makes it possible to obtain effluent without biomass, referenced EFF/N. Furthermore, during biodegradation, bacterial growth generates biological sludge, whence the excess biomass XBM that is separated from the liquid phase.

There follows a description of the pre- and post-treatments applied to the various streams H, EFF/N, and XBM of this biodegradation module M2.

Most advantageously, the toxic oils or solvents are pre-treated by the Fenton reaction in a chemical oxidation module M1.

The Fenton reaction, itself well known, serves to improve the biodegradability of organic oils and solvents and to eliminate the antioxidants that are generally present in synthetic oils, and that have a tendency to inhibit biological activity.

This reaction is based on chemical oxidation at ambient temperature and pressure (and thus under conditions that are entirely advantageous), it makes use of the oxidizing power of the hydroxyl radical $OH^-$ as obtained by chemical reaction between oxygenated water (hydrogen peroxide) $H_2O_2$ and ferrous ions $Fe^{2+}$ in an acid medium, the hydroxyl radical reacting with the organic material in order to transform it into water and carbon dioxide. In that reaction, the oxygenated water is a consumable, whereas the ferrous ions are catalysts, since during the reaction, the ferrous ion is transformed into a ferric ion $Fe^{3+}$, that may be reconverted to an $Fe^{2+}$ ion by UV irradiation.

Concretely, this pre-treatment may be performed in batch mode: initially the organic material MO for destruction is put into the reactor that already contains the $Fe^{2+}$ ions, and then the pH is reduced to 3.5 by adding sulfuric acid, after which the oxygenated water is added drop by drop in stoichiometric proportions relative to the quantity of organic material that is to be destroyed. The content of the reactor is caused to circulate throughout the reaction via a tube that contains a UV lamp serving to transform $Fe^{3+}$ ions into $Fe^{2+}$ ions. Once the reaction has terminated, pH is raised to 10 by adding NaOH, thereby having the effect of causing the iron to precipitate out and settle in the bottom of the reactor. The supernatents, containing the partially oxidized organic material (without the iron which has settled at the bottom of the reactor and which can be reused) is withdrawn and placed in a tank waiting for transfer to the module M2 once its pH has been readjusted to 7. Any gas formed during the reaction may be washed using a gas washing column. The liquid used for the washing, that picks up toxic substances, may also be oxidized subsequently, by a reaction of the Fenton type.

Concerning the module M2, the biodegradation of the oils H delivers firstly an effluent EFF/N, and secondly excess biomass XBM.

The excess biomass XMB generated during biodegradation in the module M2 is digested in a module M3 so as to produce a solid mineral waste MIN that concentrates the radioactivity of the organic material MO. Bacterial cells accumulate heavy metals on their surfaces together with the radioactive elements present in the medium, such that the excess biomass concentrates the radioactivity coming from the organic material MO, and this concentrate needs subsequently to be mineralized in order to be stored.

The digester of the module M3 is a conventional anaerobic digester from which the liquid phase is taken by tangential filtering in order to keep the biomass in the digester. Once filtered, the aqueous phase may be subjected to post-treatment by a module M4 (see below), while the contaminated biomass is extracted to constitute the final solid waste MIN, possibly after chemical oxidation by the Fenton reaction.

The effluent EFF/N coming from the biodegradation by the module M2, and/or the liquid effluent LIQ coming from digesting the biomass in the module M3, are advantageously subjected to oxidation post-treatment by respective modules M4 so as to produce respectively an effluent EFF1 that is acceptable for the site and that complies with standards (COD strictly less than 150 mg/L), and an effluent EFF2 that is recyclable.

The oxidation, which serves to destroy the soluble organic material that might be present in these effluents, is advantageously performed in the modules M4 by combined ozone and UV ray treatment, e.g. using an apparatus such as the UVOX-250 system from Wapure International GmbH, which is based on the principle of irradiating air with ultraviolet light so as to convert the oxygen in the air into ozone, and then in injecting the air/ozone mixture into the liquid for treatment via a Venturi system, the liquid for treatment also being irradiated by ultraviolet light. The ozone in solution is converted into $OH^-$ radicals presenting very great oxidation power, and thus making it possible to eliminate a very wide variety of residual substances. In particular, such treatment makes it possible to omit post-treatment using an active carbon filter, since that is not necessary. Irradiation with ultraviolet light also makes it possible to destroy practically all of the microorganisms that might be present in the effluent for treatment.

The invention claimed is:

1. A method of biologically treating a toxic liquid feedstock comprising an organic liquid phase that is dispersible and digestible, such as a toxic oil or solvent, the method being characterized by the successive steps consisting in:
   a) feeding a first vessel (100) with the liquid feedstock for treatment, the first vessel containing an aqueous phase and a first bacterial population;
   b) dissolving the liquid feedstock for treatment in the first vessel by enzymatic hydrolysis using the first bacterial population;
   c) drawing off a first reaction liquid product from the first vessel;
   d) filtering from the first reaction product the biomass contained therein, thereby obtaining a first effluent;
   e) feeding a second vessel (200) with the first effluent, the second vessel containing an aqueous phase and a second bacterial population that is different from the first bacterial population;
   f) biodegrading the first effluent in the second vessel by biological digestion using the second bacterial population;
   g) drawing off a second liquid reaction product from the second vessel;
   h) filtering from the second reaction product the biomass contained therein in order to obtain a second effluent;
   i) adjusting the bacterial concentration in the second vessel by extracting the surplus biomass;
   j) feeding a third vessel (300) with the second effluent, the third vessel containing an aqueous phase and a third bacterial population that is different from the first and second bacterial populations;
   k) reducing the residual bacterial components of the second effluent in the third vessel by bacterial action using the third bacterial population;
   l) drawing off a third liquid reaction product from the third vessel; and
   m) filtering from the third reaction product the biomass contained therein in order to obtain a third effluent;
   the third effluent constituting a final liquid effluent (EFF/N) that is essentially non-organic, and the separated biomass constituting an ultimate organic waste (DU) of reduced volume.

2. The method of claim 1, wherein steps d), h), and/or m) further comprise recycling the separated biomass to the vessel from which the filtered reaction product was drawn off.

3. The method of claim 1, further comprising recycling the final liquid effluent obtained in step m) to the first vessel.

4. The method of claim 1, wherein step h) further comprises chemical oxidation of the filtered second effluent and/or of the excess biomass obtained by filtering.

5. The method of claim 1, wherein step k) includes reducing the biomass in the third reactor (300).

6. The method of claim 1, further including, prior to step a), pre-treating (M1) the liquid feedstock for treatment by oxidation using the Fenton reaction.

7. The method of claim 1, further including a step of drawing off the excess biomass in the first, second, and/or third vessels, and of digesting (M3) said excess biomass with a liquid phase (LIQ) and a solid mineral waste (MIN) being separated.

8. The method of claim 1, further including a step of post-treating (M4) the final liquid effluent (EFF/N) from filtering of the third reaction product and/or the liquid phase (LIQ) from digesting the excess biomass by means of combined UV irradiation and ozonization.

9. An installation for implementing the method according to claim 1, the installation being characterized in that it comprises:
 a first vessel (100) containing an aqueous phase and a first bacterial population;
 means (102) for feeding the first vessel with a contaminated liquid feedstock comprising an organic liquid phase that is dispersible and digestible, such as a toxic oil or solvent, the liquid feedstock being suitable for being dissolved in the first vessel by enzymatic hydrolysis using the first bacterial population;
 means (106) for drawing off a first liquid reaction product from the first vessel;
 means (108) for filtering from the first reaction product the biomass contained therein, in order to obtain a first effluent;
 a second vessel (200) containing an aqueous phase and a second bacterial population, different from the first bacterial population;
 means (202) for feeding the second vessel with the first effluent, the first effluent being suitable for being biodegraded in the second vessel by biological digestion using the second bacterial population;
 means (206) for drawing off a second liquid reaction product from the second vessel;
 means (208, 212) for filtering from the second reaction product the biomass contained therein in order to obtain a second effluent;
 means (216, 220) for adjusting the concentration of bacteria in the second vessel by extracting surplus biomass;
 a third vessel (300) containing an aqueous phase and a third bacterial population, different from the first and second bacterial populations;
 means (302) for feeding the third vessel with the second effluent, the second effluent being suitable for having its residual bacterial components reduced by biological action of the third bacterial population;
 means (306) for drawing off a third liquid reaction product from the third vessel; and
 means (308, 316) for filtering from the third reaction product the biomass contained therein in order to obtain a third effluent, the third effluent constituting a final liquid effluent (EFF/N) that is essentially non-organic, and the separated biomass constituting an ultimate organic waste (DU) of reduced volume.

10. The installation of claim 9, wherein said means for filtering the first, second, and/or third products comprise respective tangential membrane filters (108, 208, 308).

11. The installation of claim 9 wherein said means for filtering the second and/or third product further comprise respective centrifugal separators (212, 312) and/or respective floatation systems.

12. The installation of claim 9, wherein the second vessel (200) comprises mechanical stirring and anti-foaming means (226-234) suitable for sucking in the foam formed during the biodegradation process and incorporating said foam in the aqueous phase (204) contained in the vessel.

13. The installation of claim 9, wherein the second vessel (200) comprises, located in the recirculation circuit outside the volume of the vessel: means (226-234) for pumping and recirculating the content of the vessel, together with temperature-regulation means (238, 240); means (222, 224, 242) for aerating the liquid phase, calibrated homogenization means (244); and/or means (246) for measuring and/or taking samples.

14. The installation of claim 9, further including a prior oxidation module (M1) using the Fenton reaction on the liquid feedstock for treatment.

15. The installation of claim 9, further including means for drawing off excess biomass from the first, second, and/or third vessels, and a module (M3) for digesting said excess biomass, and for separating a liquid phase (LIQ) and a solid mineral waste (MIN).

16. The installation of claim 9, further including a post-treatment module (M4) for applying combined UV irradiation and ozonation to the final liquid effluent (EFF/N) from the filtering of the third reaction product, and/or on the liquid phase (LIQ) from digestion of the excess biomass.

* * * * *